(12) United States Patent
Little et al.

(10) Patent No.: US 7,280,317 B1
(45) Date of Patent: Oct. 9, 2007

(54) DISK DRIVE INCLUDING AN ACTUATOR WITH A PIVOT SHAFT AND A DISK DRIVE BASE WITH AN ACTUATOR SUPPORT SECTION FOR ATTACHMENT OF THE PIVOT SHAFT AND A SEAL

(75) Inventors: Aaron D. Little, Campbell, CA (US); Seungman Chang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 347 days.

(21) Appl. No.: 11/086,637

(22) Filed: Mar. 22, 2005

(51) Int. Cl.
G11B 33/14 (2006.01)
G11B 5/55 (2006.01)
(52) U.S. Cl. .................................. 360/265.6
(58) Field of Classification Search .. 360/97.02–97.04, 360/265.6
See application file for complete search history.

(56) References Cited

U.S. PATENT DOCUMENTS 4,682,255 A * 7/1987 Sleger et al. ............ 360/265.6

* cited by examiner

Primary Examiner—A. J. Heinz
(74) Attorney, Agent, or Firm—Stetina, Brunda, Garred & Brucker

(57) ABSTRACT

A disk drive includes a rotary actuator including a pivot bearing cartridge. The pivot bearing cartridge has a pivot shaft with a shaft body and a shaft threaded end. A disk drive base includes inner and outer sides. The disk drive base includes an actuator support section that has a seal portion including a seal attachment surface disposed along the outer side. The actuator support section includes a raised portion extending from the seal portion towards the inner side. The actuator support section includes a hole portion positioned laterally within the raised portion and extending through the raised portion towards the outer side. The hole portion is engaged with the shaft threaded end. The hole portion includes a distal end that does not extend beyond the seal attachment surface. A seal is disposed upon the attachment surface for sealing the pivot shaft within the disk drive base.

11 Claims, 3 Drawing Sheets

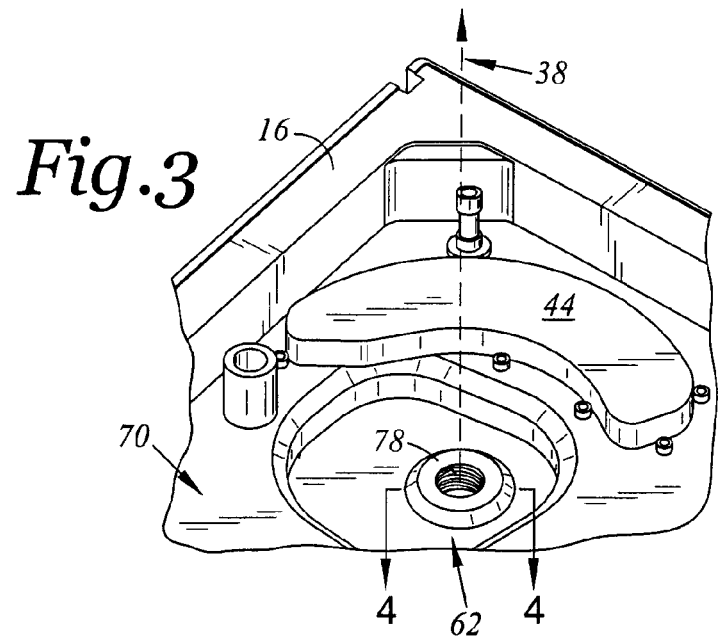
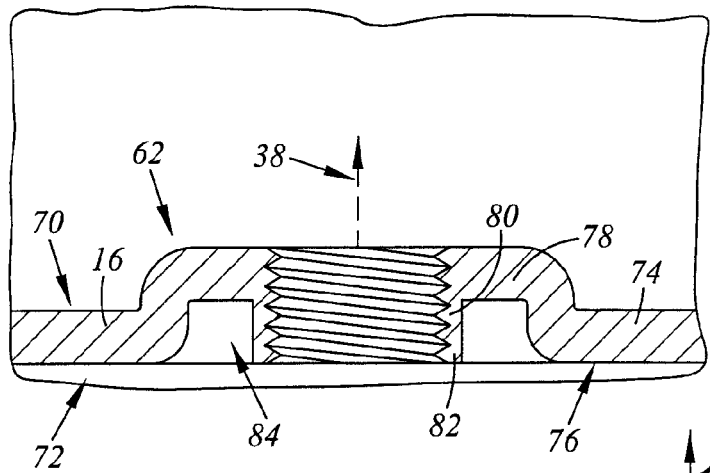
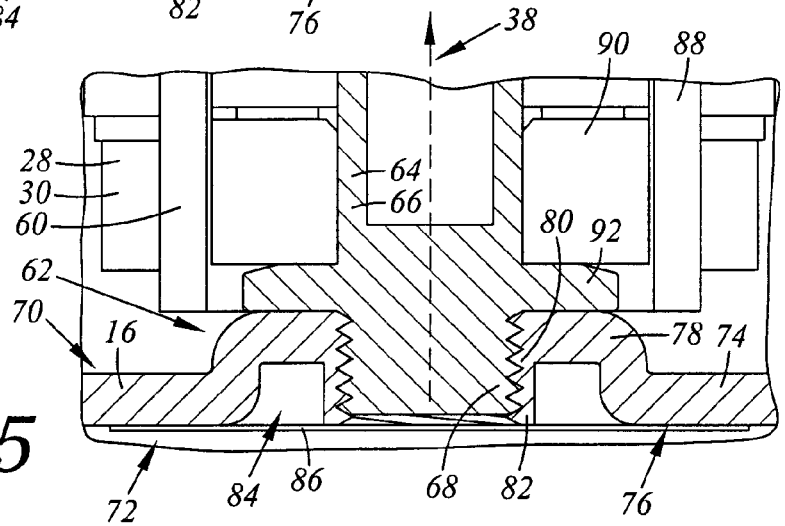

DISK DRIVE INCLUDING AN ACTUATOR WITH A PIVOT SHAFT AND A DISK DRIVE BASE WITH AN ACTUATOR SUPPORT SECTION FOR ATTACHMENT OF THE PIVOT SHAFT AND A SEAL

CROSS REFERENCE TO RELATED APPLICATIONS

Not applicable.

BACKGROUND OF THE INVENTION

1. Field of the Invention

The present invention relates generally to disk drives, and in particular to a disk drive including an actuator with a pivot shaft and a disk drive base with an actuator support section for attachment of the pivot shaft and a seal.

2. Description of the Prior Art

The typical hard disk drive includes a head disk assembly (HDA) and a printed circuit board assembly (PCBA) attached to a disk drive base of the HDA. The head disk assembly includes at least one disk (such as a magnetic disk), a spindle motor for rotating the disk, and a head stack assembly (HSA). The printed circuit board assembly includes a servo control system in the form of a disk controller for generating servo control signals. The head stack assembly includes at least one transducer head, typically several, for reading and writing data from and to the disk. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit assembly. A conventional "rotary" or "swing-type" actuator assembly typically includes a rotary actuator having an actuator body. The actuator body has a bore and a pivot bearing cartridge engaged within the bore to facilitate rotational movement of the actuator assembly between limited positions about an axis of rotation. A coil support extends from one side of the actuator body. An actuator coil is supported by the coil support and is configured to interact with one or more permanent magnetic elements, typically a pair, to form a voice coil motor. One or more actuator arms extend from an opposite side of the actuator body. Each head gimbal assembly includes a transducer head, typically a magneto-resistive ("MR") head, which is distally attached to each of the actuator arms. Each magnetic disk includes opposing disk surfaces. Data may be recorded along data annular regions on a single disk surface or both. As such, the head stack assembly may be pivoted such that each transducer head is disposed adjacent to the various data annular regions from adjacent to the outer diameter to the inner diameter of each disk.

The spindle motor includes a spindle motor magnet and a stator. The magnet may be attached to an underside of the spindle motor hub. The stator may be disposed at the disk drive base and may be integrated therewith.

The printed circuit board assembly is attached to an underside of the disk drive base. A base insulator may be disposed between the disk drive base and the printed circuit board assembly for electrically insulating the various electrical components of the printed circuit board assembly from the disk drive base. In some applications a PCBA shield may be disposed over the printed circuit board assembly with the printed circuit board assembly between the PCBA shield and the disk drive base.

As mentioned above the head stack assembly includes the pivot bearing cartridge. The pivot bearing cartridge includes a pivot shaft. The pivot shaft includes a shaft body and a shaft threaded end. The shaft threaded end is engaged in a threaded hole formed in the disk drive base. A seal may be disposed over the threaded hole for sealing the disk drive base.

A topic of concern is the attachment of such threaded end of the pivot shaft into the threaded hole in the disk drive base. As weight and sizing specifications are tightened, the relative thickness of the disk drive base is reduced. Such reduction results in less vertical surface in the threaded hole of the disk drive base to engage the threaded end of the pivot shaft.

Accordingly, there is a need in the art for an improved pivot bearing cartridge attachment arrangement and disk drive base seal configuration in comparison to the prior art.

SUMMARY OF THE INVENTION

An aspect of the present invention can be regarded as a disk drive. The disk drive includes a rotary actuator including a pivot bearing cartridge. The pivot bearing cartridge has a pivot shaft. The pivot shaft includes a shaft body and a shaft threaded end. The disk drive further includes a disk drive base including an inner side and an opposing outer side. The disk drive base includes an actuator support section. The actuator support section includes a seal portion including a seal attachment surface disposed along the outer side. The actuator support section further includes a raised portion extending from the seal portion towards the inner side. The actuator support section further includes an internally threaded hole portion positioned laterally within the raised portion and extending through the raised portion towards the outer side. The hole portion is engaged with the shaft threaded end for attaching the rotary actuator to the disk drive base. The hole portion includes a distal end. The distal end does not extend beyond the seal attachment surface in a direction from the raised portion towards the seal portion. The actuator support section further includes a depression formed about the hole portion and between the hole portion and the raised portion. The disk drive further includes a substantially flat seal disposed over the hole portion and the depression. The seal is disposed upon the attachment surface for sealing the pivot shaft within the disk drive base.

According to various embodiments, the seal portion, the raised portion, and the hole portion may be formed of a unitary piece of material. The actuator support section may be formed of a metal material, such as a steel material. The actuator support section may be formed of a stamped metal material. The actuator support section may also be nickel plated. The hole portion may have a depth at least twice a thickness of the seal portion. The seal may be formed of a plastic material or a metal material. The seal may be attached to the seal portion with a pressure sensitive adhesive. The pivot shaft may include a flange extending from the shaft body, and the flange is disposed against the raised portion.

BRIEF DESCRIPTION OF THE DRAWINGS

FIG. 3 is an enlarged perspective view of an inner side of a portion of the disk drive base of FIG. 2 including an actuator support section;

FIG. 4 is an enlarged cross-sectional side view of the actuator support section of the disk drive base of FIG. 3 as seen along axis 4-4; and FIG. 5 is the enlarged cross-sectional side view of the actuator support section of FIG. 4 as shown with a portion of a rotary actuator and a portion of a pivot bearing cartridge.

DESCRIPTION OF THE PREFERRED EMBODIMENTS

Figure 1:
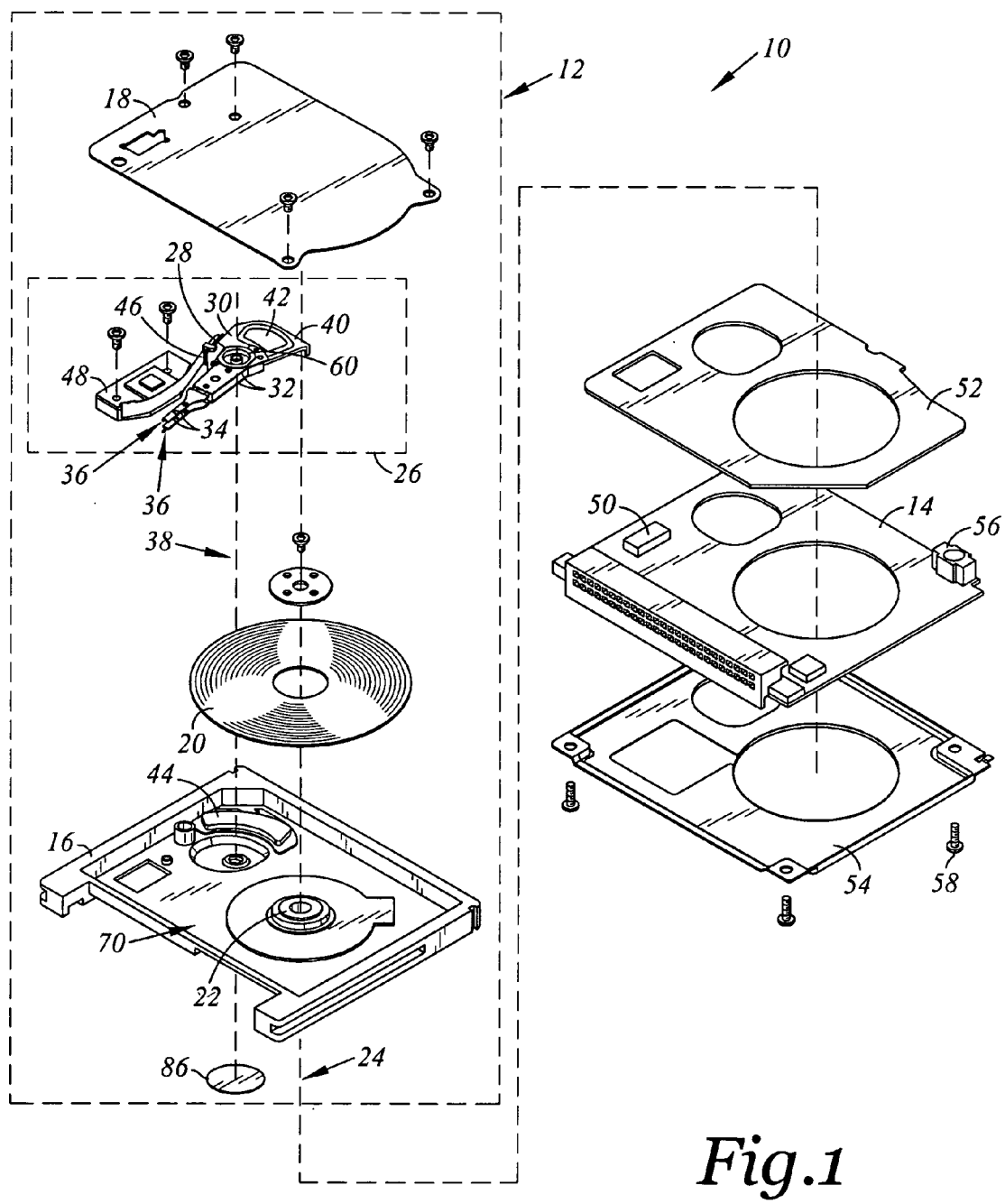
FIG. 1 is an exploded top perspective view of a disk drive in accordance with an aspect of the present invention.

Referring now to the drawings wherein the showings are for purposes of illustrating preferred embodiments of the present invention only, and not for purposes of limiting the same, FIGS. 1-5 illustrate a disk drive in accordance with the aspects of the present invention.

Referring now to FIG. 1, there is depicted an exploded perspective view of a disk drive 10 as constructed in accordance with an aspect of the present invention. The disk drive 10 includes a head disk assembly (HDA) 12 and a printed circuit board assembly (PCBA) 14. The head disk assembly 12 includes a disk drive housing having disk drive housing members, such as a disk drive base 16 and a cover 18. The disk drive base 16 and the cover 18 collectively house a disk 20. The disk 20 contains a plurality of tracks for storing data. The head disk assembly 12 further includes a spindle motor 22 for rotating the disk 20 about a disk rotation axis 24. The head disk assembly 12 further includes a head stack assembly 26 rotatably attached to the disk drive base 16 in operable communication with the disk 20. The head stack assembly 26 includes a rotary actuator 28.

The rotary actuator 28 includes an actuator body 30 and actuator arms 32 that extend from the actuator body 30. Distally attached to the actuator arms 32 are suspension assemblies 34. The suspension assemblies 34 respectively support sliders 36. Each of the sliders 36 includes a transducer head. The suspension assemblies 34 with the sliders 36 are referred to as head gimbal assemblies. It is contemplated that the number of actuator arms and suspension assemblies may vary depending upon the number of disks and disk surfaces utilized.

The actuator body 30 includes a bore, and the rotary actuator 28 further includes a pivot bearing cartridge 60 engaged within the bore for facilitating the actuator body 30 to rotate between limited positions about an axis of rotation 38. The actuator 28 further includes a coil support 40 that extends from one side of the actuator body 30 opposite the actuator arms 32. The coil support 40 is configured to support an actuator coil 42.

A magnetic element 44 is attached to the disk drive base 16. The coil 42 interacts with the magnetic element 44 to form a voice coil motor for controllably rotating the actuator 28. The head stack assembly 26 further includes a flex circuit assembly 46 and a cable connector 48. The cable connector 48 is attached to the disk drive base 16 and is disposed in electrical communication with the printed circuit board assembly 14 through a socket 50. The flex circuit assembly 46 supplies current to the actuator coil 42 and carries signals between the transducer heads of the sliders 36 and the printed circuit board assembly 14.

A base insulator 52 is provided between the printed circuit board assembly 14 and the disk drive base 16 for selectively electrically insulating various electrical components of the printed circuit board assembly 14. A PCBA shield 54 is provided for protecting the printed circuit board assembly 14 from both physical damage and electrical discharge events. In addition, the PCBA shield 54 is used to prevent electromagnetic interference generated from within the disk drive 10 from interfering with a host electronic unit or other nearby devices. Likewise, the PCBA shield 54 is also used to prevent electromagnetic interference generated from outside of the disk drive 10 from interfering with the disk drive 10. The PCBA shield 54 is disposed over the printed circuit board assembly 14 with the printed circuit board assembly 14 between the PCBA shield 54 and the disk drive base 16.

The printed circuit board assembly 14 is shown with a spindle motor connector 56, which is used to effect electrical communication between the printed circuit board assembly 14 and the spindle motor 22. A fastener 58 may be used to affix the spindle motor connector 70 to the printed circuit board assembly 14 and the PCBA shield 54.

Figure 2:
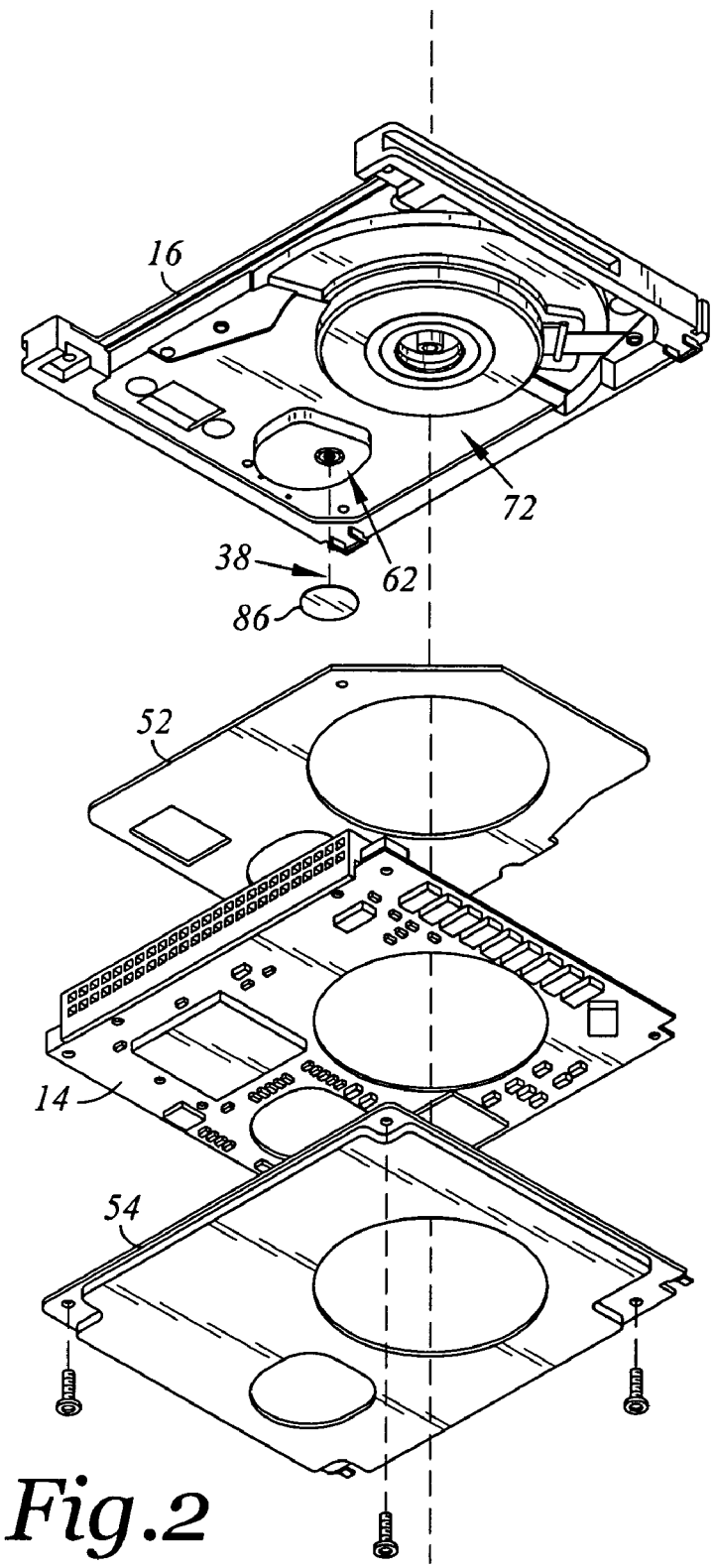
FIG. 2 is an exploded bottom perspective view of a disk drive base, a base insulator, a printed circuit board, and a PCBA shield of the disk drive of FIG. 1.

Referring additionally to FIG. 2, there is shown an exploded bottom perspective view of the disk drive base 16, the base insulator 52, the printed circuit board assembly 14, and the PCBA shield 54 of the disk drive 10 of FIG. 1. FIG. 3 is an enlarged perspective view of the disk drive base 16 of FIG. 2. FIG. 4 is an enlarged cross-sectional side view of an actuator support section 62 of the disk drive base 16 of FIG. 3 as seen along axis 4-4. FIG. 5 is the enlarged cross-sectional side view of the actuator support section 62 of FIG. 4 as shown with a portion of a rotary actuator 28 and a portion of a pivot bearing cartridge 60.

An aspect of the present invention can be regarded as the disk drive 10. The disk drive 10 includes the rotary actuator 28 including the pivot bearing cartridge 60. The pivot bearing cartridge 60 has a pivot shaft 64 as shown in FIG. 5. The pivot shaft 66 includes a shaft body 66 and a shaft threaded end 68. The disk drive 10 further includes the disk drive base 16 including an inner side 70 (as seen in FIGS. 1 and 3) and an opposing outer side 72 (as seen in FIG. 2). The disk drive base 16 includes the actuator support section 62. The actuator support section 62 includes a seal portion 74 including a seal attachment surface 76 disposed along the outer side 72. The actuator support section 62 further includes a raised portion 78 extending from the seal portion 74 towards the inner side 70. The actuator support section 62 further includes an internally threaded hole portion 80 positioned laterally within the raised portion 78 and extending through the raised portion 78 towards the outer side 72. As shown in FIG. 5, the hole portion 80 is engaged with the shaft threaded end 68 for attaching the rotary actuator 28 to the disk drive base 16. The hole portion 80 includes a distal end 82. The distal end 82 does not extend beyond the seal attachment surface 76 in a direction from the raised portion 78 towards the seal portion 74. The actuator support section 62 further includes a depression 84 formed about the hole portion 80 and between the hole portion 80 and the raised portion 78. The disk drive 10 further includes a substantially flat seal 86 disposed over the hole portion 80 and the depression 84. The seal 86 is disposed upon the seal attachment surface 76 for sealing the pivot shaft 64 within the disk drive base 16.

As mentioned above, the distal end 82 does not extend beyond the seal attachment surface 76 in a direction from the raised portion 78 towards the seal portion 74. As such this allows the substantially flat seal 86 to be substantially flat and there would be not protruding bulge under the central portion of the seal 86. As used herein the terms does not extend beyond the seal attachments surface 76 refers to the distal end 82 being intended to be manufactured at or short of the seal attachment surface 76 in a direction from the raised portion 78 towards the seal portion 74. In this regard, the distal end 82 may extend beyond the seal attachment surface 76 in a direction from the raised portion 78 towards the seal portion 74 provided it is within manufacturing tolerances of the intended location being at the seal attachment surface.

It is contemplated that the particular formation of the seal portion 74, the raised portion 78, and the hole portion 80 facilitates a relative lengthening of threaded material of the disk drive base 16 that is much greater than a mere punched hole formed through the disk drive base 16. In this regard, the hole portion 80 may have a depth at least twice a thickness of the seal portion 74 such as shown for example.

According to various embodiments, the seal portion 74, the raised portion 78, and the hole portion 80 may be formed of a unitary piece of material. The actuator support section 62 may be formed of a metal material, such as a steel material. The actuator support section 62 may be formed of a stamped metal material. In this regard, the contemplated configuration of the seal portion 74, the raised portion 78, and the hole portion 80 facilitates such stamping formation. As can be appreciated, utilization of a stamping process is relatively cost effective. The actuator support section 62 may also be nickel plated. Thus, where a steel material is used for the disk drive base 16 and the actuator support section 62, the steel material may be protected with the nickel material. The seal 86 may be formed of a plastic material or a metal material. The seal 86 may be attached to the seal portion 74 with a pressure sensitive adhesive.

The pivot bearing cartridge 60 may include a pivot sleeve 88 (a portion of which is shown in FIG. 5). Bearing sets 90 may be provided between the pivot sleeve 88 and the pivot shaft 64. For additional support, the pivot shaft 64 may include a flange 92 extending from the shaft body 66, and the flange 92 is disposed against the raised portion 78.

We claim:

1. A disk drive comprising:
   a rotary actuator including a pivot bearing cartridge, the pivot bearing cartridge having a pivot shaft, the pivot shaft including a shaft body and a shaft threaded end;
   a disk drive base including an inner side and an opposing outer side, the disk drive base including an actuator support section, the actuator support section including:
   a seal portion including a seal attachment surface disposed along the outer side;
   a raised portion extending from the seal portion towards the inner side;
   an internally threaded hole portion positioned laterally within the raised portion and extending through the raised portion towards the outer side, the hole portion being engaged with the shaft threaded end for attaching the rotary actuator to the disk drive base, the hole portion including a distal end, the distal end not extending beyond the seal attachment surface in a direction from the raised portion towards the seal portion; and
   a depression formed about the hole portion and between the hole portion and the raised portion; and
   a substantially flat seal disposed over the hole portion and the depression, the seal being disposed upon the attachment surface for sealing the pivot shaft within the disk drive base.

2. The disk drive of claim 1 wherein the seal portion, the raised portion, and the hole portion are formed of a unitary piece of material.

3. The disk drive of claim 1 wherein the actuator support section is formed of a metal material.

4. The disk drive of claim 3 wherein the actuator support section is formed of a steel material.

5. The disk drive of claim 3 wherein the actuator support section is formed of a stamped metal material.

6. The disk drive of claim 3 wherein the actuator support section is nickel plated.

7. The disk drive of claim 1 wherein the hole portion has a depth at least twice a thickness of the seal portion.

8. The disk drive of claim 1 wherein the seal is formed of a plastic material.

9. The disk drive of claim 1 wherein the seal is formed of a metal material.

10. The disk drive of claim 1 wherein the seal is attached to the seal portion with a pressure sensitive adhesive.

11. The disk drive of claim 1 wherein the pivot shaft includes a flange extending from the shaft body, the flange is disposed against the raised portion.

* * * * *